United States Patent [19]

Doane et al.

[11] Patent Number: 5,038,911

[45] Date of Patent: Aug. 13, 1991

[54] CONTROLLED SPACING INDUCTION FROM PLURAL LINES

[75] Inventors: Martin R. Doane, Ada; James P. Kohls; Ahmad Khodor, both of Grand Rapids, all of Mich.

[73] Assignee: Rapistan Corporation, Grand Rapids, Mich.

[21] Appl. No.: 597,103

[22] Filed: Oct. 12, 1990

Related U.S. Application Data

[63] Continuation of Ser. No. 352,002, May 15, 1989, abandoned, which is a continuation-in-part of Ser. No. 311,826, Feb. 16, 1989, abandoned.

[51] Int. Cl.$^5$ .............................................. B65G 47/70
[52] U.S. Cl. .................................... 198/357; 198/460
[58] Field of Search ........................ 198/357, 444, 460

[56] References Cited

U.S. PATENT DOCUMENTS

| | | | |
|---|---|---|---|
| 2,304,447 | 12/1942 | Feusier | 198/357 |
| 2,978,092 | 4/1961 | Phillips et al. | 198/444 |
| 3,063,544 | 11/1962 | Yen | 198/357 |
| 3,075,630 | 1/1963 | Fisk . | |
| 3,096,871 | 7/1963 | Anderson . | |
| 3,223,225 | 12/1965 | Clark et al. | 198/357 |
| 3,242,342 | 3/1966 | Gabar . | |
| 3,250,375 | 5/1966 | Bonthuis et al. . | |
| 3,251,452 | 5/1966 | Conway et al. . | |
| 3,323,634 | 6/1967 | Arvidson et al. . | |
| 3,458,026 | 7/1969 | Lauzon et al. . | |
| 3,485,339 | 12/1969 | Miller et al. . | |
| 3,491,903 | 1/1970 | Hedrick et al. | 198/357 X |
| 3,512,624 | 5/1970 | Crane . | |
| 3,515,254 | 6/1970 | Gary . | |
| 3,523,618 | 8/1970 | Nielsen | 198/357 X |
| 3,747,781 | 7/1973 | Daigle et al. . | |
| 3,771,783 | 11/1973 | McInerny . | |
| 3,774,748 | 11/1973 | Dederer et al. . | |
| 3,817,368 | 6/1974 | Wentz et al. . | |
| 3,822,009 | 7/1974 | Richards . | |
| 3,827,545 | 8/1974 | Buhayar . | |
| 3,905,491 | 9/1975 | Harrison | 198/357 X |
| 4,044,897 | 8/1977 | Maxted . | |
| 4,077,620 | 3/1978 | Frank et al. . | |
| 4,113,244 | 9/1978 | Ruenzi . | |
| 4,140,310 | 2/1979 | Schroter . | |
| 4,158,456 | 6/1979 | Letz et al. . | |
| 4,318,540 | 3/1982 | Paananen et al. . | |
| 4,331,328 | 5/1982 | Fasig . | |
| 4,360,098 | 11/1982 | Nordstrom | 198/444 X |
| 4,429,781 | 2/1984 | Holzhauser | 198/357 X |
| 4,451,027 | 5/1984 | Alper . | |

FOREIGN PATENT DOCUMENTS

| | | |
|---|---|---|
| 0130810 | 1/1985 | European Pat. Off. . |
| 0274229 | 7/1988 | European Pat. Off. . |
| 0310411 | 4/1989 | European Pat. Off. . |
| 2336984 | 7/1977 | France . |
| 2581215 | 10/1986 | France . |
| 53-133861 | 4/1977 | Japan . |
| 59-18283 | 6/1983 | Japan . |
| 1587715 | 4/1981 | United Kingdom . |
| 2123375 | 2/1984 | United Kingdom ................. 198/357 |

*Primary Examiner*—D. Glenn Dayoan
*Attorney, Agent, or Firm*—Price, Heneveld, Cooper, DeWitt & Litton

[57] ABSTRACT

A conveyor system including an induction subassembly for producing a desired spacing between packages as they are discharged from a single induction line or merged from multiple lines. Each induction line includes a conveyor and a speed controller for controlling the running speed of the conveyor in a manner that discharges a package as close as possible to a time necessary to provide a desired gap with a previously-discharged package. A control monitors movement of packages on the conveyor of each line and includes a microcomputer for determining a speed adjustment that would be required for each speed controller to cause the packages on each of the lines to reach the associated discharge conveyor as close as possible to the desired time. The microcomputer determines which of the packages would read the associated discharge conveyor closest to the desired time and causes the speed controller for the associated conveyor to effect its speed adjustment to discharge its package. A new desired time is established for other lines based upon the estimated discharge time of the package that is selected for discharge. Speed adjustments include a constant acceleration to a higher discrete speed or deceleration to a lower discrete speed from a nominal discrete speed with a return to the nominal speed prior to discharging the package.

14 Claims, 7 Drawing Sheets

CONTROLLED SPACING INDUCTION FROM PLURAL LINES

CROSS-REFERENCE TO RELATED APPLICATION

This application is a continuation of copending application 07/352,002 filed on May 15, 1989 now abandoned which is a continuation-in-part of application Ser. No. 311,826, filed Feb. 16, 1989, now abandoned.

BACKGROUND OF THE INVENTION

This invention relates to conveyor systems and in particular to induction subsystems for providing controlled separation or gaps between packages being delivered single file to a sortation subsystem for sorting of the packages.

In a warehouse, such as a trans-shipment distribution warehouse, packages are unloaded from trucks or rail cars bringing product from various sources and reorganized, for example, according to product groupings, for storage of like products in common areas of a warehouse, or according to a particular ultimate destination for reloading onto a trailer or the like. A conveyor system for accommodating this activity conventionally includes many infeed spurs which converge and merge the packages into a single-file of product. The single-filed product is then sorted package by package onto sortation take-away spur lines by a sortation subsystem.

In order to sort packages on the sortation subsystem, it is necessary that the packages be separated by a gap of sufficient length to allow a mechanical sortation mechanism to remove individual packages from the sortation conveyor at the desired point by displacement of the moving package laterally from the sortation line, as the package passes the appropriate take-away line. While a suitable spacing, or gap, is required between packages, any spacing larger than that required to operate the sortation subsystem decreases the capacity of the conveyor system to convey packages.

One technique for establishing gaps between packages is to discharge the stream of packages from an accumulating conveyor onto a series of belts of increasing speed. As the package discharges from one belt to the next, it is accelerated and spaced from the subsequent package. The difficulty with such a system is that the gap is proportional to the length of the package. The result is that, if system parameters are selected to properly gap the smallest packages, wasteful large gaps will occur between longer packages.

Another difficulty that must be addressed in such a system is the merging of packages into a single file for sortation. Because warehouse floor space is usually at a premium, it is disadvantageous to provide an accumulation conveyor between a completely merged line of packages and the sortation subsystem because the required length of the accumulation conveyor would be great. Accordingly, it may be desirable to separate the infeed lines into two or more feed lines each having a short accumulation conveyor and provide the final package merge immediately upstream the sortation subsystem. Multiple accumulation conveyors feeding the sortation subsystem can run at slower speeds than would be required to deliver the same volume of packages from a single accumulation line. This also increases the life expectancy of the conveyor and reduces noise.

SUMMARY OF THE INVENTION

The present invention provides a controlled spacing induction subsystem which produces a greater throughput, or flow of packages through the system, while minimizing system down time and damage to packages. The present invention further provides for combining the functions of final merging of two or more feed lines with that of spacing of packages in an individual operation in which packages are inducted from a plurality of feed lines in a manner that desirable spacing is provided between the packages regardless of package size. According to one aspect of the invention, a conveyor system includes a metering conveyor receiving a conveyor and speed control means for controlling the speed of the metering conveyor. The system further includes means for sensing the leading and trailing edges of packages on the metering conveyor and for monitoring linear movement of the metering conveyor. The system includes means responsive to the sensing and monitoring means for determining the centerline of a package on the metering conveyor and for tracking such centerline. Additionally, the system includes means for adjusting the speed of the metering conveyor in response to means for determining an adjustment required to provide a desired gap with a prior package, with the adjusting being initiated only when the centerline of the prior package reaches the receiving conveyor.

A conveyor system according to another aspect of the invention includes a plurality of conveying lines each having package conveying means for transporting packages and discharge means for discharging packages from the conveying means onto a receiving means. The system further includes control means for controlling the plurality of conveying lines including means for controlling the speed of each of the conveying means, the speed controlling means having means for operating each of the conveying means at least two running speeds, both of which are greater than zero. The control means further includes means for monitoring movement of the packages on each of the conveying means and for actuating the speed control means in a manner to cause packages to reach the discharge means at times that will create the desired gaps between the packages received by the receiving means with the actuating means selecting between the two speeds for each of the conveying means.

According to yet another aspect of the invention, the control means may further include means for determining the moment a package on each of the conveyor lines would reach the associated discharge means with the associated conveyor travelling at a nominal preselected speed. The control means further includes means for determining the amount of speed adjustment that would be required for each speed controlling means to cause the package on each of the lines to reach the associated discharge means as close as possible to a desired time that is determined as providing a desired space with the previously discharged package. The control means further includes means for determining which of the packages would reach the associated discharge means closest to the desired time and for causing the speed controlling means for the associated conveying means to effect its speed adjustment to discharge its package.

These and other related objects, advantages and features of this invention will become apparent upon review of the following specification in conjunction with the drawings.

DESCRIPTION OF THE PREFERRED EMBODIMENT

Figure 1:
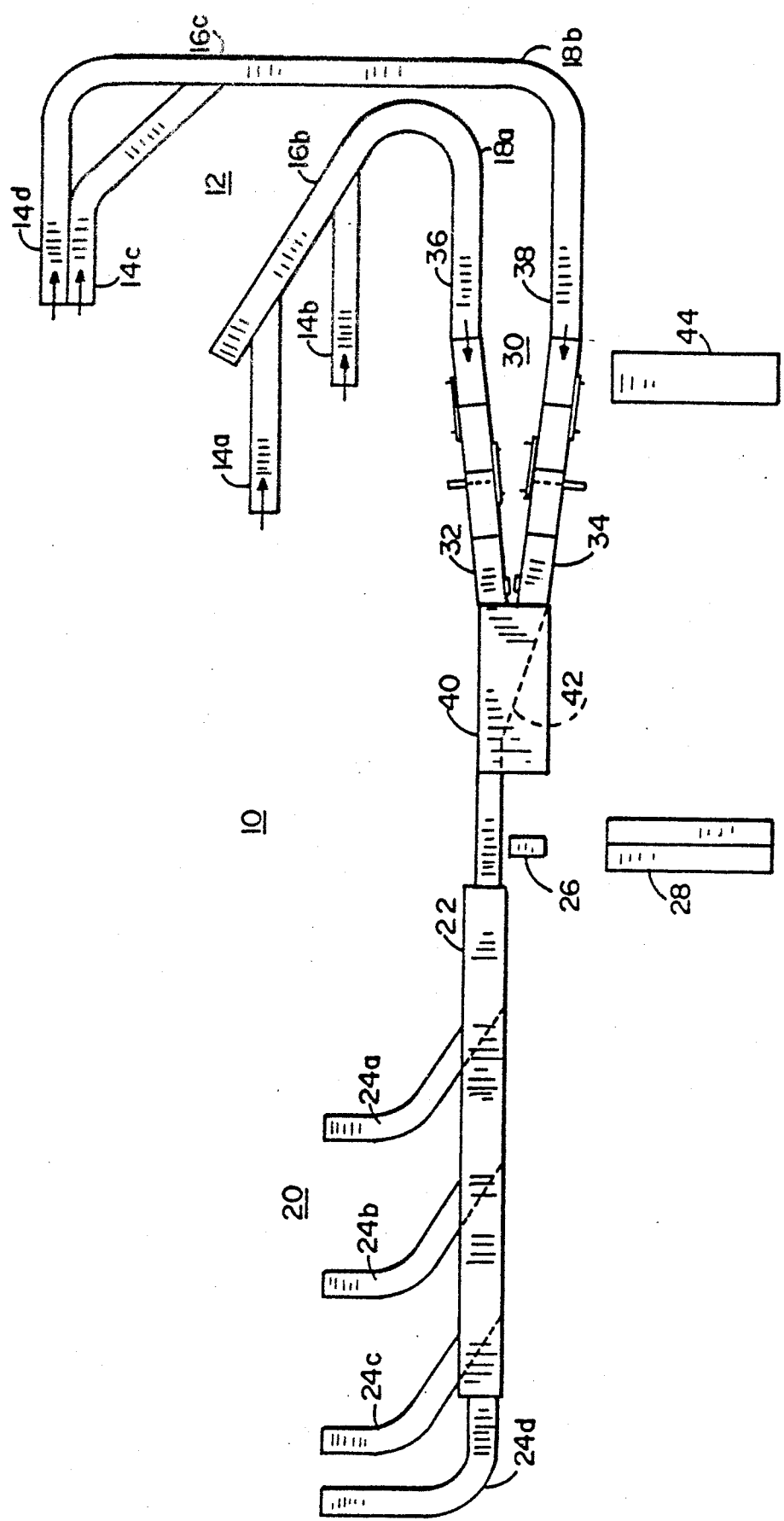
FIG. 1 is a plan view of a conveyor system embodying the invention.

Referring now specifically to the drawings, and the illustrated embodiments depicted therein, a conveyor system generally illustrated at 10 includes an infeeding subsystem 12 having a plurality of infeed conveyor lines 14a through 14d. Infeed line 14a merges with another infeed line 14b at junction 16b to form a combined feed line 18a. Infeed lines 14c and 14d combine at junction 16c to form a combined feed line 18b. Conveyor system 10 further includes a sortation subassembly 20 including a sortation conveyor 22 and a plurality of take-away lines 24a through 24d. Sortation subsystem 20 may further include a laser scanner 26 for encoding bar-codes from packages entering conveyor 22 into a sortation controller 28, which compares each product bar-code with a table stored in memory to determine the appropriate take-away line 24a through 24d to dispatch the package to and to actuate a take-away device (not shown) at the required time to laterally displace the package from the sortation conveyor 22 to the appropriate take-away line 24a through 24d.

Conveyor system 10 further includes a multiple line induction subassembly 30 which, in the illustrated embodiment, includes a first induction line 32 and a second induction line 34. Although the invention is illustrated in a induction subassembly having two induction lines, it is capable of implementation in a system having only one line or more than two induction lines. Particular advantages of the invention may be realized in a system having only one induction line and the number of plural induction lines to which it may apply is theoretically unlimited. Feed line 18a is joined with first induction line 32 by an accumulator 36 which accumulates product awaiting entry to first induction line 32. An accumulator 38 is positioned between infeed line 18b and second induction line 34. An alignment conveyor 40 receives packages discharged from induction lines 32 and 34 and provides a guide bar 42 for laterally shifting packages discharged from line 34 into a single file with packages discharged from line 32. Packages are discharged from alignment conveyor 40 onto sortation conveyor 22. Induction subassembly 30 further includes a control 44 which receives inputs from input devices associated with induction lines 32 and 34 and produces outputs for controlling the speeds of lines 32 and 34. Control 44 may additionally interface with sortation controller 28 and other control portions of the conveyor system 10.

Figure 2:
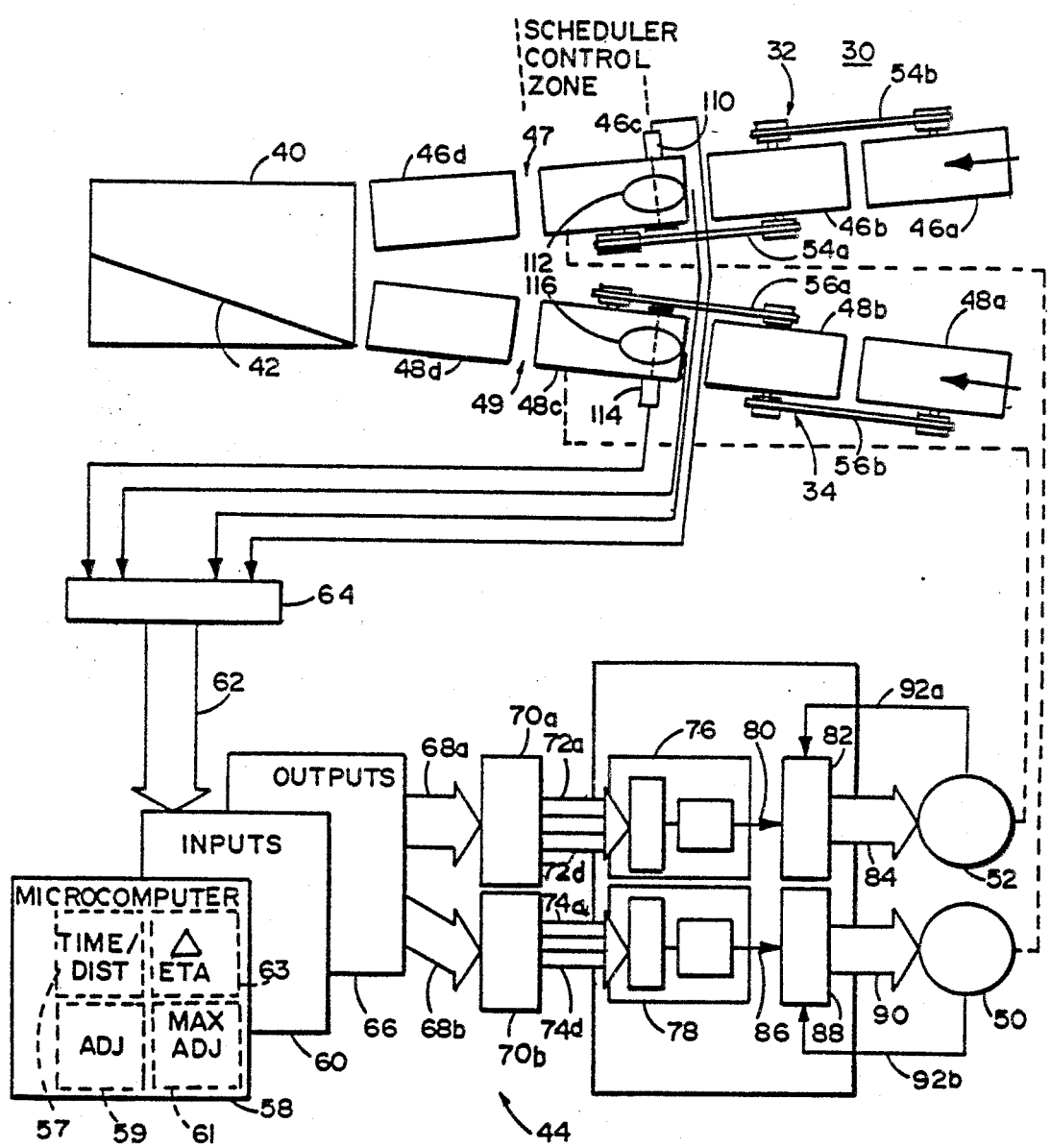
FIG. 2 is a plan view of a multiple line induction subassembly embodying the invention.

Each induction line of multiple line induction subassembly 30 includes four belt conveyors designated 46a through 46d for first induction line 32 and 48a through 48d for induction line 34 (FIG. 2). Belt conveyor 46c is a metering conveyor and is driven from an AC servo motor and reducer assembly 50 having a holding brake (not shown). Belt conveyor 48c is also a metering conveyor and is independently driven by AC servo motor and reducer assembly 52. Belt conveyor 46b is driven by speed reducer 54a mechanically coupled with belt 46c and belt 46a is driven by speed reducer 54b driven from conveyor 46b. Speed reducers 54a and 54b are each configured to reduce the speed of the driven conveyor to 70% of the driving conveyor. In this manner, belt conveyor 46b is driven at 70% of the speed of conveyor 46c and conveyor 46a is driven at 70% of the speed of conveyor 46b. Likewise, belt conveyor 48b is driven at 70% of the speed of belt conveyor 48c by speed reducer 56a and belt conveyor 48a is driven at 70% of the speed of belt conveyor 48b by speed reducer 56b.

Belt conveyors 46d and 48d receive packages from conveyors 46c and 48c respectively and are operated at fixed speeds identical with alignment conveyor 40 independently of the speeds of conveyors 46a-46c and 48a-48c. In the illustrated embodiment, conveyors 40, 46d and 48d are driven at 350 feet per minute, which is the same speed as sortation conveyor 22, and metering conveyors 46c and 48c are independently operable at three discrete running speeds: 0 fpm, 350 fpm and 600 fpm. Although conveyors 46c and 48c are operable at three discrete running speeds, servo motors 50 and 52 are capable of infinitely variable speed adjustment over a wide range of speeds and are controlled in a manner that provides constant acceleration (and deceleration) between discrete running speed levels. The acceleration level is preselected to avoid overturning a package and avoiding slippage between the packages and the belts.

Control 44 includes a microcomputer 58 having an input circuit board 60 which receives parallel inputs 62 from an input module 64. Microcomputer 58 additionally includes an output circuit board 66 which provides parallel outputs 68a to an output module 70a and parallel outputs 68b to an output module 70b. Input board 60 is a 48 channel parallel input card having a standard bus interface with microcomputer 58. Output board 66 is a 48 channel parallel output card having a standard bus interfaced with microcomputer 58. Output module 70a provides output signals on four parallel lines 72a through 72d that are presented to a servo interface circuit 76 as selection lines for one of four running speeds for servo motor 52, although only three running speeds are used in the illustrated embodiment. Output module 70b provides output signals on lines 74a through 74d that are presented to a servo interface circuit 78 as running speed selection lines for servo motor 50. Microcomputer 58, in the illustrated embodiment, is a commercially available microcomputer sold by Cubit and based on a 16 bit Intel 80186 microprocessor. Input module 64 and output modules 70a and 70b may be any suitable commercially available interface modules.

Servo interface circuit 76 produces, in response to the levels of lines 72a-72d, a DC analog voltage output on line 80 which is provided as a velocity command to a servo motor controller 82. Controller 82, in turn, produces multi-phase AC outputs 84 to control the direc- "selected" package plus the amount of desired gap to follow the "selected" package with length measurements converted to time using table 57. This new DESIRED ETA will apply to all packages except for the "selected" package. The "selected" package is removed from consideration during further passes through this portion of the routine. The next package will be considered as the "top of line" package for the next iteration.

After the new DESIRED ETA for non"selected" packages in the system has been calculated, control passes to block 228 where it is determined whether all of the lines have had at least one package selected. If not, control passes to block 214 where the ETA DIFFERENCE for the packages that have not been selected for each line is determined based on the difference between the CURRENT ETA of that package and the DESIRED ETA. The SUGGESTED ETA for these packages are again calculated in blocks 216 through 222 and a determination of the next "selected" package is made in block 224. Control then passes to block 226 where the newly "selected" package is removed from the selection pool and a new DESIRED ETA is determined for remaining non-"selected" packages. Control then passes to block 228 where it is determined whether all lines have had at least one package selected. If so, then the system has determined the line that will discharge the next package, the CURRENT ETA for at least one package on each line and the NEW ADJ for the corresponding induction line, which is the most recently-selected value of SUGGESTED ADJ, to be applied to the line. However, up to control block 228, the system has merely evaluated data and has not effected any control operations.

Control passes from block 228 to block 230 (FIG. 4b) where the status of all lines are checked for the availability of packages. Control passes from block 230 to block 232 where, for the first operational line, it is determined whether the line that is being evaluated is presently engaged in an adjustment operation. If not, then control passes to block 234 where the CURRENT ADJ parameters of the line are modified by NEW ADJ and the CURRENT ETA for the package is updated to reflect the new value of CURRENT ADJ. This is accomplished by obtaining an ETA CHANGE on the basis of the NEW ADJ in lookup table 61 provided in microcomputer 58. The retrieved change in ETA is applied to the CURRENT ETA to provide an updated CURRENT ETA. The adjustment in belt speed is initiated, or put into effect, at this point of the routine. If it is determined in block 232 that the line is presently engaged in an adjustment operation, control passes to block 236 where the CURRENT ADJ is compared with the NEW ADJ, determined in blocks 214 through 228, and makes minor adjustments to the NEW ADJ to compensate for real-time lapses that have occurred during this execution of the control routine. Additionally, the proposed modification to the CURRENT ADJ required by the NEW ADJ is tested to determine if an impermissible result is obtained. If so, the NEW ADJ is modified to make the CURRENT ADJ a permissible value and the new CURRENT ADJ is calculated. The value of CURRENT ETA of the package is modified in the manner set forth in block 234, to reflect the effect of the NEW ADJ on CURRENT ADJ. The speed modification underway is modified according to the new CURRENT ADJ. The timing of the speed changes is implemented at regular intervals in an adjustment routine 300 (FIG. 5) that is initiated separate from routine 120, in real time once every millisecond, to provide precise timing of the adjustments.

From blocks 234 and 236, control passes to a block 238 where it is determined whether the CURRENT ADJ and CURRENT ETA have been recalculated and the speed adjustment control function put into effect for all lines. If not, control passes to block 230. If it is determined at block 238 that all lines have been processed, then control passes to block 240 where the software awaits another event of the type that will initiate another execution of the routine at one of blocks 200, 202, 204 or 206.

Figure 5:
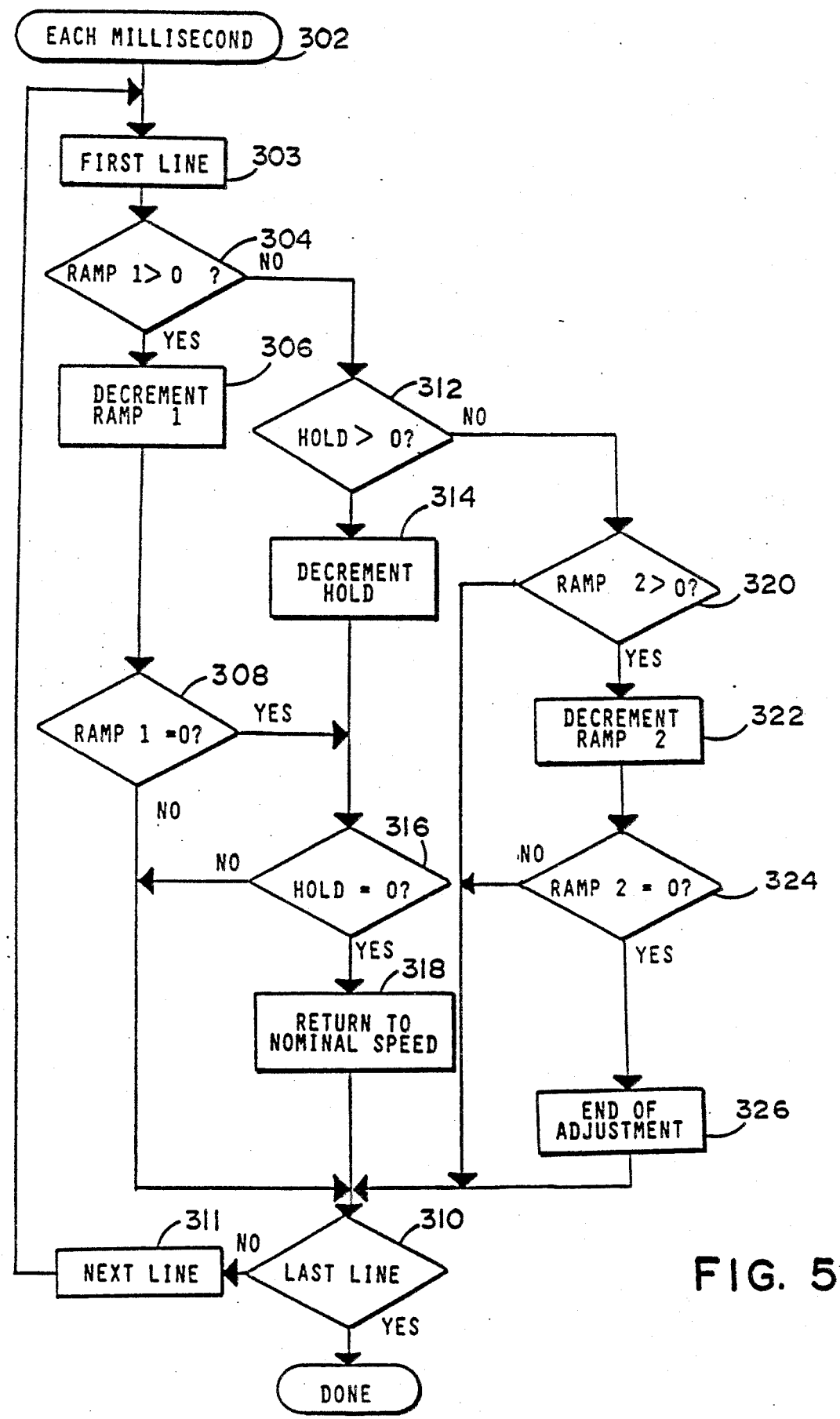
FIG. 5 is a logic flow diagram of the program used to implement conveyor speed changes.

Once every millisecond in real time, adjustment routine 300 is initiated (302) for the first line (FIG. 5). The program determines for the first line (303) whether (304) there is a ramp 1 adjustment underway. If so, then control passes to block 306 where the number in the ramp 1 event register is decremented by 1 millisecond and to block 308 where it is determined whether the value of the ramp 1 event number, which represents its remaining time duration, has been decremented to zero. If not, then no action is taken and control passes to block 310 where it is determined whether additional lines remain to be examined.

If it is determined at 304 that there is presently no ramp 1 value, then control passes to block 312 where it is determined whether a hold portion of an adjustment is underway. If so, control passes to block 314 where the hold register is decremented and to block 316 where it is determined whether the hold value has been decremented to zero. If not, then no action is taken and control passes to block 310. If it is determined at block 316 that the value in the hold register has been decremented to zero, then control passes to block 318 where microcomputer 58 changes the value of lines 72a–72d or 74a–74d to order a return to nominal speed.

If it is determined at blocks 304 and 312 that no ramp 1 or hold event is underway, control passes to block 320 where it is determined, whether a ramp 2 event is underway. If not, then no action is taken and control passes to block 310. If a ramp 2 event is underway, then control passes to block 322 where the ramp 2 register is decremented and to block 324 where it is determined if the ramp 2 register has been decremented to zero. If not then no action is taken. If, however, the ramp 2 register has been decremented to zero, control passes to block 326 where an end of adjustment event initiates routine 120 at block 206. If it is determined at block 310 that additional lines remain to be served, then control passes to block 311 for examination of the next line for adjustment events. If all lines are served, then the routine is exited.

As previously set forth, the amount of gap compression between packages is obviously limited at times by the physical parameters of the system, for example a temporary absence of products to induct to the sortation area. The induction subsystem will, however, function to shrink excessive gaps and to stretch gaps that are too short. The present invention increases the capacity, or through-put, of the system and provides the capability for inducting packages from either one line or from multiple lines. An adjustment to the running speed of a metering conveyor is often reversed, cancelled, or extended before it is completely carried out and several packages at a time may be under the control of the scheduler routine for each metering conveyor. In this manner, the system repetitively reevaluates the need for adjustments to line speeds and reverses its previous tion of rotation and velocity of servo motor 52, although only one direction of rotation is used in the illustrated embodiment. Likewise, servo interface circuit 78 produces, in response to the levels of lines 74a-74d, an analog DC voltage output on a line 86 which is provided as a velocity command to a servo motor controller 88, which produces multi-phase AC outputs 90 for inputs to servo motor 50. Feedback lines 92a, from servo motor 52 to controller 82, and 92b, from servo motor 50 to controller 88, provide velocity feedback signals from velocity transducers (not shown) to the associated controller to effectuate velocity control of the motors. In the illustrated embodiment, the servo motor controllers and servo motors are commercially available and sold in a prepackaged system by Allen Bradley, under Model No. 1391-AA45.

Figure 3:
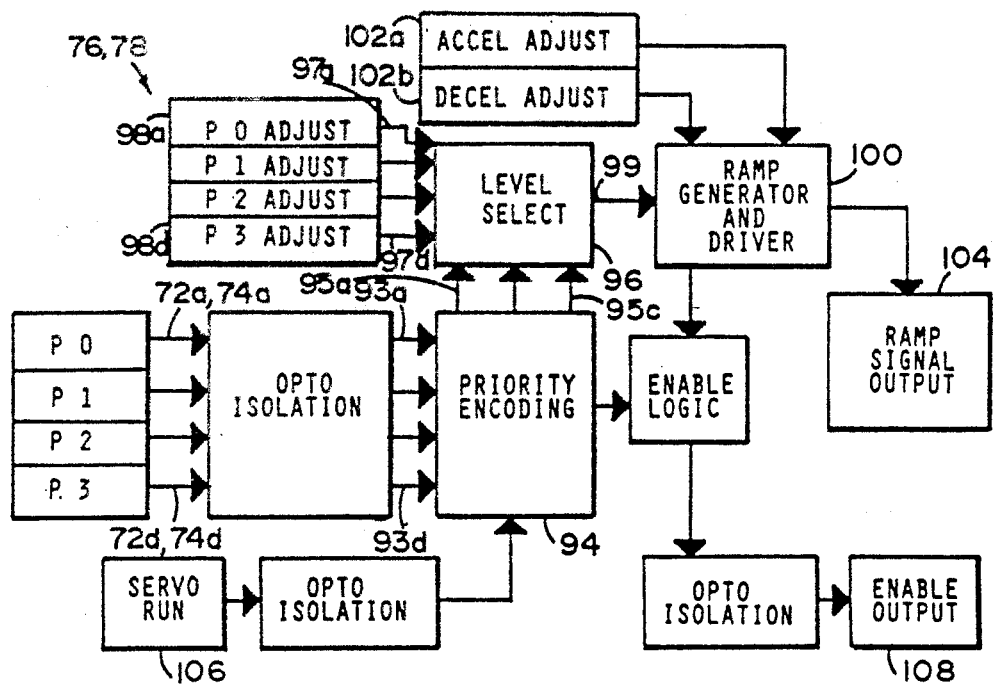
FIG. 3 is a circuit diagram in block diagram form of an interface circuit between the microcomputer and servo motor control in the preferred embodiment.
Figure 7:
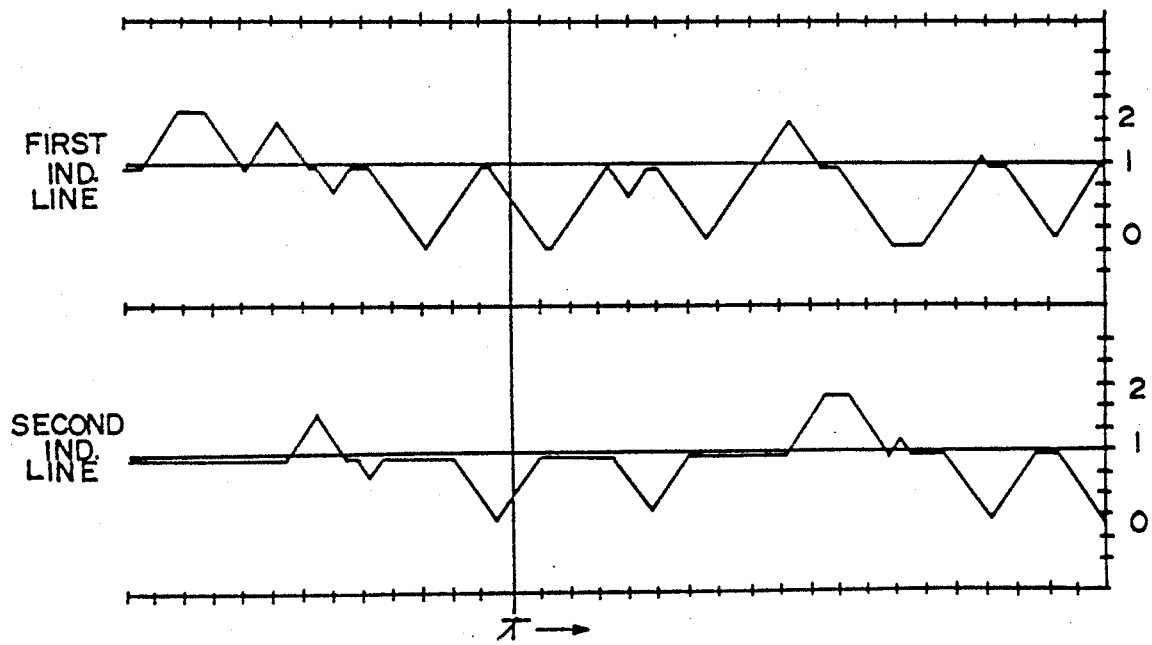
FIG. 7 is a diagram of the conveyor speed for a two-line induction subassembly.

A block diagram for servo interface circuits 76 and 78 is illustrated in FIG. 3. The signals on speed-select lines 72a through 72d or 74a through 74d are optically isolated and provided on lines 93a-93d to a priority encoding circuit 94. Priority encoding circuit 94 compares the current speed-select inputs with the immediately previous speed-select inputs and selects a new running speed on a priority basis, with higher speeds having priority. Priority encoding circuit 94 interprets the condition of an absence of input signals on lines 93a-93d as a zero speed, or brake selection command. Outputs from priority encoding circuit 94 are provided on lines 95a-95c to a level-select circuit 96 which also receives analog voltage signals on lines 97a-97d from manually-settable voltage setting devices 98a through 98d, to establish the values of the four selectable running speed levels. Output 99 from level-select circuit 96 is the voltage level set by the adjusting means 98a-98d which corresponds to the speed selected by encoding circuit 94 and provides an input signal to a ramp generator and driver circuit 100. Ramp generator and driver circuit 100 additionally receive manually settable ramp adjustment inputs from devices 102a and 102b. Ramp adjustment devices 102a and 102b establish the values of the constant slopes of the analog voltage ramps between speed changes, which, in turn provide constant positive acceleration to increasing discrete speed levels and negative acceleration to decreasing discrete speed levels. The settings of devices 102a and 102b thus establish the acceleration forces exerted on the packages. In the preferred embodiment, adjustment devices 102a and 102b are set to produce a maximum acceleration/deceleration force on the packages that will not topple packages on the conveyor. Ramp generator and driver circuit 100 produce an analog speed signal output 104 which is provided on line 80 or 86 to the respective servo motor controller. Servo interface circuit 76, 78 additionally receives a servo run interlock input 106 from other portions of the conveyor system to actuate the servo interface circuit and additionally produces an enable output 108 to release the brake (not shown) for the respective servo motor 50, 52 when a non-zero speed is selected.

Input module 64 receives two inputs from each induction line 32 and 34. A first input for line 32 is received from a photo eye 110 projecting a beam which is blocked by the presence of a package in its path on metering conveyor 46c. A second input for line 32 is provided by a position encoder 112 which outputs a pulse to input module 64 having a signal transition every ½" travel of the belt of metering conveyor 46c. Likewise, a photo eye 114 is associated with line 34 and projecting a beam blocked by a package in its path on metering conveyor 48c. A second input for line 34 is provided by a position encoder 116 which outputs a pulse to input module 64 for every ½" travel of the belt of conveyor 48c. Although the speed of conveyor belts 46a, 46b and 46c are fixedly interrelated, the speeds of conveyors 48a, 48b and 48c are fixedly interrelated and conveyors 46d, 48d and 40 are operated at a common fixed speed, the relative speeds between conveyors 46a through 46c, conveyors 48a through 48c and conveyors 46d, 48d and 40 are continually changing in a manner that will now be set forth.

A) Single Induction Line Operation

Packages entering first induction line 32 from accumulator 36 are accelerated from belts 46a to 46b and from belts 46b to 46c to establish a preliminary gap, or spacing, between the packages. As a package traverses metering conveyor 46c, its leading edge will initiate blockage of the beam of photo eye 110 which will initiate execution of a control routine in microcomputer 58. The position of the package will be tracked in half-inch increments by signals provided from encoder 112. As the package continues to traverse conveyor 46c, its trailing edge will allow reestablishment of the beam of photo eye 110, which will again initiate execution of a control routine in microcomputer 58. As the package continues to traverse belt 46c, its longitudinal center will eventually reach the discharge interface 47 between belts 46c and 46d at which point the package will be half on conveyor 46c and half on conveyor 46d. Once a package is more than half on conveyor 46d, its rate of travel is presumed to be controlled by the speed of the belt of conveyor 46d. At that point in time, the package is said to be released from induction line 32 and another execution of a control routine is initiated in microcomputer 58. The system does not, however, require a package sensor positioned at the discharge interface 47. The sequence of events that occurs for packages traversing first induction line 32 from accumulator 36 occur in an essentially identical fashion for packages traversing second induction line 34 from accumulator 38.

Figure 6:
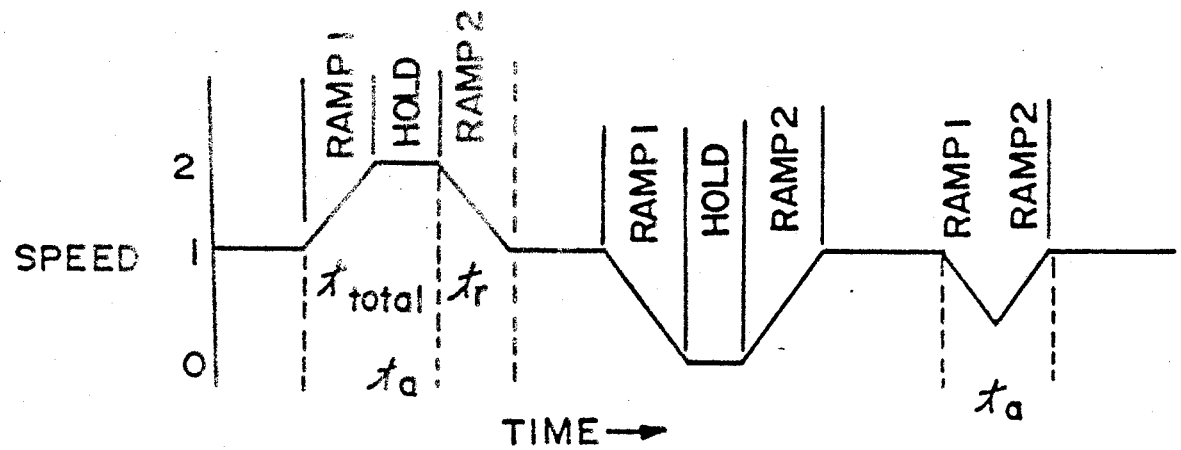
FIG. 6 is a diagram of the conveyor speed for a one-line induction subassembly.

Operation of each induction line may be understood by reference to FIG. 6 in which a chart of line speed versus time is illustrated for induction line 32 or 34 or for a single induction line system. The abscissa represents time and the ordinance represents line speed with 0 indicating a stopped condition, 1 indicating nominal running speed and 2 representing a second selectable running speed that is higher than speed 1. The flat portions of each curve represent constant conveyor speeds and the sloping portions represent acceleration (sloping upwardly from left-to-right) and deceleration (sloping downwardly from left-to-right). When it is determined, in a manner that will be set forth in more detail below, that the gap length between a package on the metering conveyor and prior package is greater than or less than a desired gap length, the metering conveyor is either accelerated toward higher speed 2 to decrease an excessive gap or decelerated toward lower speed 0 to increase a deficient gap.

Each adjustment event includes an acceleration or deceleration of constant magnitude, defined as ramp 1, and an acceleration or deceleration of constant magnitude and polarity opposite to that of ramp 1, defined as ramp 2. The slopes of ramp 1 and ramp 2 are established by the settings of devices 102a and 102b and represent the value of the acceleration and deceleration of the metering conveyor. If the duration of the adjustment period is long enough, then the metering conveyor must be decelerated from nominal speed 1 to speed 0 or accelerated to speed 2 and held at that speed for a "hold" period, prior to returning to nominal speed. This results from the speed of the metering conveyor being limited at the upper end by the value of discrete speed 2 and at the lower end by speed 0, which is a stopped conveyor. If the duration of the adjustment period is relatively short, then the metering conveyor is decelerated from nominal speed toward speed 0 or accelerated toward speed 2 but doesn't reach the higher, or lower, discrete speed. Rather, after the adjustment period (ramp 1), the metering conveyor is returned to nominal speed (ramp 2) without a "hold" period.

When the longitudinal center of a package reaches the discharge interface, where it is released from its metering conveyor to the receiving conveyor, the control routine determines a value in real time at which the leading edge of a subsequent package must arrive at its discharge interface in order to establish a desired gap or spacing with the trailing edge of the discharged package. This parameter is labeled the desired time of arrival (DESIRED ETA) of the subsequent package. The control routine determines the estimated time of arrival of the subsequent package (CURRENT ETA) from the profile of the conveyor speed from the time that the leading edge of the package entered the control zone in a manner that will be discussed in more detail below. The difference between the CURRENT ETA and the DESIRED ETA (ETA DIFFERENCE) is applied by the control routine to one of two tables 59 (ADJ table), the particular table being determined by whether ETA DIFFERENCE is positive (requiring deceleration) or negative (requiring acceleration). A value of time, in milliseconds (SUGGESTED ADJ), is obtained from the appropriate ADJ table 59, corresponding to the combined length of ramp 1 and hold, if any, that will bring CURRENT ETA to DESIRED ETA.

Although the value of SUGGESTED ADJ will essentially eliminate any difference between DESIRED ETA and CURRENT ETA, the package may be too close to the discharge interface to allow the metering conveyor to carry out the speed adjustment and return to nominal speed before the longitudinal center of the package arrives at the discharge interface. The metering conveyor must return to nominal speed, which is the same speed as the receiving conveyor, to provide a smooth discharge of the package. To assure the return to normal speed, the control routine applies the POSITION parameter, which indicates the distance of the package's longitudinal centerline from the discharge interface and is kept current from the conveyor position encoder, to a lookup table 61 to select a value of the maximum speed adjustment (MAX ADJ) that may be carried out while still returning the speed of the metering conveyor to return to nominal speed. If the value of SUGGESTED ADJ is greater than the value of MAX ADJ, then it is reduced to not exceed MAX ADJ and is designated CURRENT ADJ. The induction line may have more than one package in the control zone on the metering conveyor. Therefore, the adjustment to the speed of the metering conveyor (TOTAL ADJUST) is based on the value of CURRENT ADJ for the package closest to discharge.

Once the TOTAL ADJUST is determined for an induction line, microcomputer 58 provides commands on lines 72a-72d or 74a-74d, for the duration of ramp 1 and hold period, requesting speed 0 or 2 and, for the duration of ramp 2 period and beyond, requesting a return to nominal speed. The associated servo interface circuit 76, 78 responds to the speed commands on lines 72a-72d or 74a-74d by linearly ramping output 104 upward or downward toward the level set by the corresponding speed adjust device 98a-98d at a rate set by the corresponding acceleration adjust device 102a, 102b. Once output 104 reaches the new level corresponding to conveyor speed 0 or 2, it is capped at this level during the hold period by ramp generator and driver circuit 100. Output 104 is linearly ramped to a value representing nominal speed 1 during ramp 2 period at a rate set by the corresponding acceleration adjust device 102a, 102b.

From the moment that a package enters the control zone of an induction line, any speed adjustments to prior packages that are simultaneously in the control zone will affect the ETA of that package. To compensate for this, a lookup table 63 provides a value used by the control routine to adjust the ETA parameter (Δ ETA) of a package by the amount of adjustment that occurs to a package from prior packages in the control zone. An additional lookup table 57 provides conversions between time durations and the linear distance (TIME/DIST.) traveled by the metering conveyor at nominal speed.

B) Multiple Induction Line Operation

Beginning when a package enters metering conveyor 46c from conveyor 46b and blocks the beam of photo eye 110, and likewise, when a package enters metering conveyor 48c and blocks the beam of photo eye 114, various parameters relating to the package are monitored and updated in microcomputer 58. During this period, each package is under the precise control of a package scheduler program 120 which, through a series of control routines, manipulates on a real-time basis the instantaneous speeds of servo motors 50 and 52 to cause packages to be discharged from metering conveyors 46c and 48c to receiving conveyors 46d and 48d in a manner that will cause the packages to have a desired gap or spacing therebetween as the packages traverse belt 40 toward the sortation system. When the package is discharged to receiving conveyor 46d or 48d, the parameters relating to the package are cleared from the microcomputer. While, in the illustrated embodiment, the desired package spacing is a predetermined fixed spacing, in certain applications it may be desired to provide a desired spacing that relates to another parameter, such as the width of the package.

It is important to an understanding of the invention to recognize that more than one package may be within the scheduler control zone under the control of microcomputer 58 for each induction line at any one time and that the discharging of packages from first and second induction lines 32 and 34 is not necessarily, or even typically, in an alternating sequence. Rather, in essence, the control routine 120, on an event driven basis, repetitively determines the estimated time of arrival (ETA) of the leading edge of each package within the control zone, the necessary adjustment to the speed of each servo motor 50, 52 to cause each package to arrive at the point of discharge 47, 49 at a desired time to provide desired spacing and which line is capable of causing its respective packages to arrive closest to the desired time, taking into account restraints on the amount of adjustment that may be made in the ETA of each package. When the selection has been made of the package to be discharged next, the desired time for arrival of the remaining packages in the control zone are adjusted accordingly and physical adjustments in the speeds of motors 50 and 52 are effected.

It bears repeating that the control routine is event-driven. Each time that a package blocks the photo eye, unblocks the photo eye, is discharged from the control zone, and each time a speed adjustment is effected, the control routine 120 is executed. Therefore, the decision of which package from which line is the priority package and what speed adjustment to make on each induction line is reevaluated repetitively. It has been found that by so doing, the illustrated conveyor system operates at a much higher rate of package through-put.

For each package that enters the scheduler control zone by arriving at photo eye 110 or 114 a memory file in microcomputer 58 is opened for the following parameters of the package:

Package Length
Current Estimated Time of Arrival (CURRENT ETA)
Suggested Estimated Time of Arrival (SUGGESTED ETA)
Current Adjustment Specified for the Package (CURRENT ADJ)
New Adjustment Specified for the Package (NEW ADJ)
Desired Gap
Position of Package on Conveyor (POSITION)

As previously set forth, more than one package may be within the scheduler control zone for each induction line and the memory space for each package is freed as the package is discharged onto the respective receiving conveyor. The most downstream package for each induction line is considered the "top of the line" package for that line.

Figure 4A:
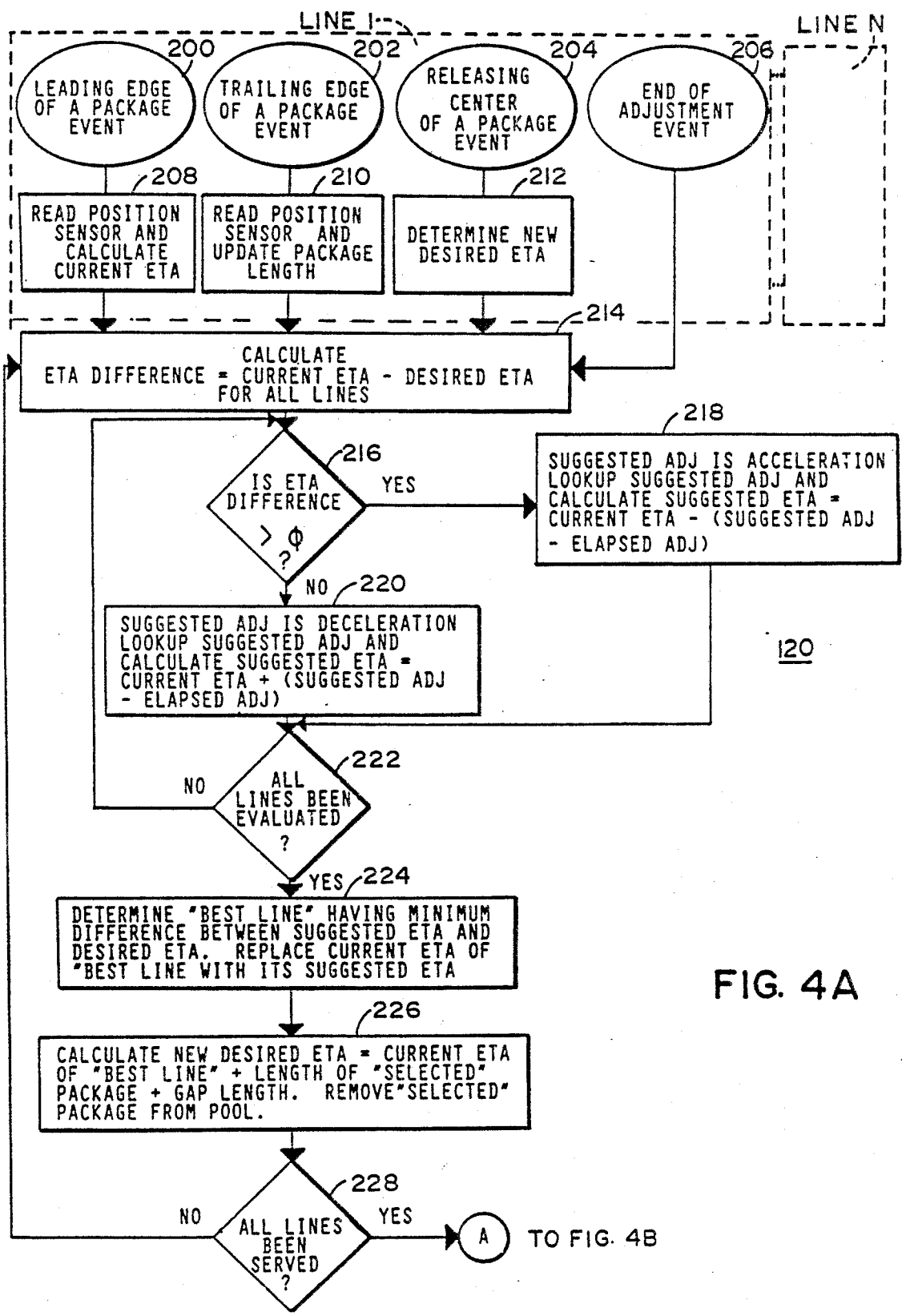
FIGS. 4a and 4b are a logic flow diagram of the program used to control the microcomputer.
Figure 4B:
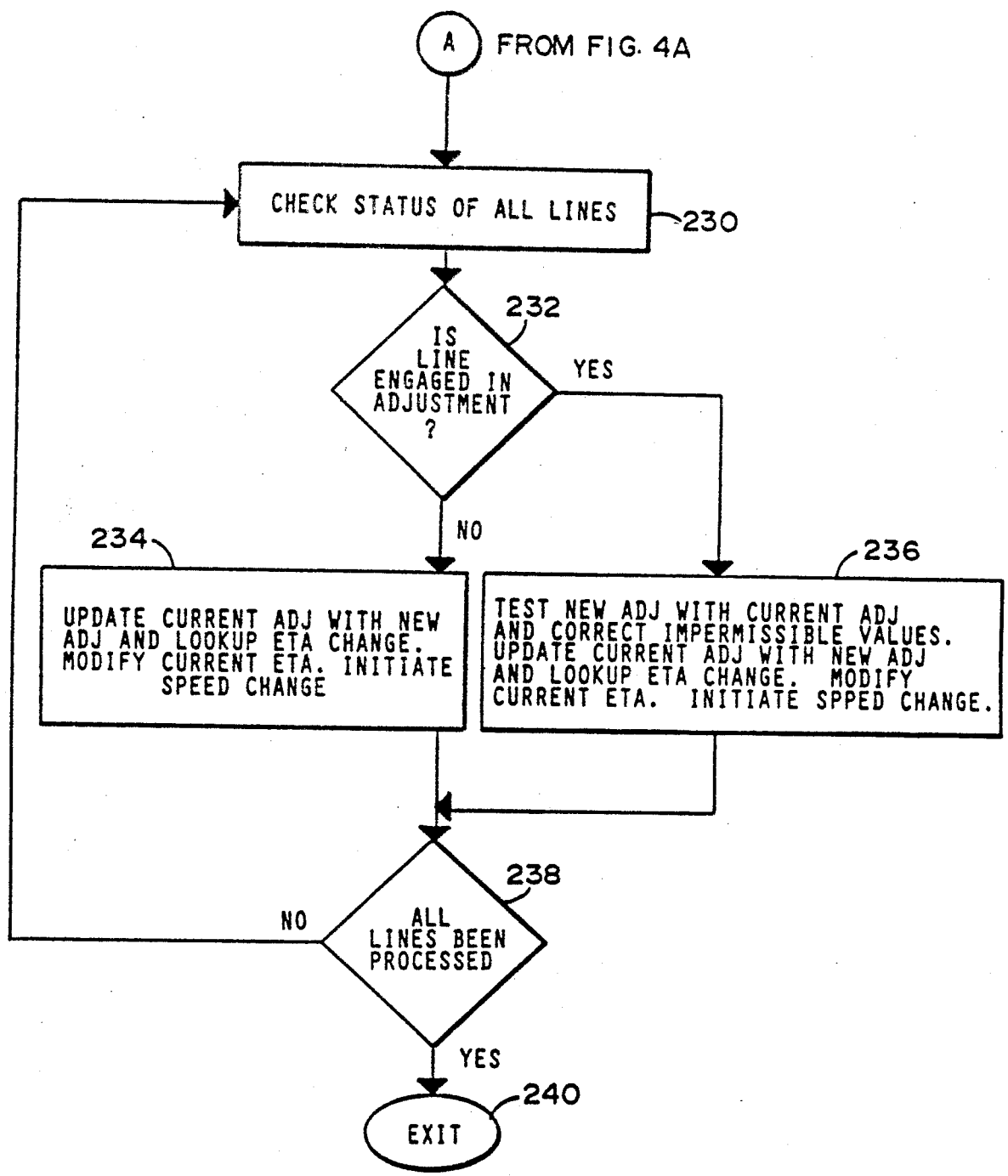

A discussion of the package scheduler software routine 120 is made in reference to FIGS. 4a and 4b. Software routine 120 is event driven, which means that the software routine illustrated in FIGS. 4a and 4b is executed in response to an occurrence of an event in real time on induction line 32 or 34 or, if n induction lines are provided, then on any of lines 1 through n. Routine 120 is executed, with respect to the first induction line (line 1) at 200 in response to the breaking of the light beam from photo eye 110, at 202 in response to the reestablishment of the light beam of photo eye 110 at the trailing edge of a package, at 204 upon the release of a package to receiving conveyor 46d and at 206 upon completion of an adjustment of the speed of metering conveyor 46c.

When the execution of routine 120 is initiated at 200 upon the leading edge of a package event, position encoder 112 is read at 208 and a CURRENT ETA is calculated for the package breaking the light beam. The CURRENT ETA is calculated by combining the length of conveyor 46c, between photo eye 110 and its discharge point 47, converting the distance to time using table 57, with the remaining affect that any in-process adjustment would have, using table 63. Because the length of the package is not known to the system at this point, a default value is assigned for package length. If the execution of routine 120 is initiated at 202 in response to the trailing edge of a package event, the position encoder 112 is read at 210 and the default value of package length is replaced by the actual length of the package. When execution of routine 120 is initiated by a package releasing event at 204, the program determines at 212 the ETA of the next package that would be optimal (DESIRED ETA) by combining the release time and one-half the length of the package being discharged (converted to time) and the desired spacing between packages (converted to time).

Control passes from blocks 206, 208, 210 or 212 to block 214 where the ETA DIFFERENCE is determined for all packages as the difference between the CURRENT ETA stored for each package and the DESIRED ETA for all packages. The DESIRED ETA for all packages is initially established at 212 in response to a package being released from any line at 204 and is updated in a manner set forth below. From block 214 control passes to 216 where it is determined for a particular package whether the ETA DIFFERENCE is positive, i.e., greater than 0. If so, then the package would arrive at the point of discharge too late and control passes to block 218 where an appropriate adjustment for that package (SUGGESTED ADJ) is selected from lookup tables 59 and 61 on the basis of the value of the ETA DIFFERENCE and the position of the package on the conveyor with respect to the point of discharge. If the value of MAX ADJ obtained by applying the POSITION parameter to lookup table 61 is less than the value of SUGGESTED ADJ obtained by applying the ETA DIFFERENCE value to table 59, then SUGGESTED ADJ will be reduced to MAX ADJ. Once the SUGGESTED ADJ is selected, a SUGGESTED ETA is determined for that package as the CURRENT ETA minus the change in arrival time that will be effected by SUGGESTED ADJ from which any elapsed speed adjustments that have already been effected with respect to that package while in the control zone (ELAPSED ADJ) is subtracted. If it is determined at 216 that the ETA DIFFERENCE is less than 0 then control passes to block 220 where an appropriate deceleration adjustment (SUGGESTED ADJ) is selected from lookup tables 59 and 61 on the basis of the value of ETA DIFFERENCE and POSITION as previously set forth. The value of SUGGESTED ETA is calculated as the CURRENT ETA plus the change in arrival time that will be effected by the SUGGESTED ADJ minus ELAPSED ADJ.

From block 218 or 220 control passes to block 222 where it is determined whether a SUGGESTED ETA has been calculated for each "top of line" package for each line. If not, control passes to block 216 for determination of the SUGGESTED ETA of the next package. This process continues until a SUGGESTED ETA has been assigned to the "top of line" packages.

When all lines have SUGGESTED ETAs assigned, control then passes from block 222 to block 224 where the control examines the SUGGESTED ETA for all lines and determines the difference between the SUGGESTED ETA for each "top of line" package and the DESIRED ETA for the system. The control selects the line having the minimum difference between SUGGESTED ETA and DESIRED ETA. Any ties are broken by a priority designation that may be fixed to a particular line or may alternate between lines. Once the "best line" is selected in this manner, the CURRENT ETA is replaced with the SUGGESTED ETA for its "selected" package. Control then passes to block 226 where the DESIRED ETA of the system is updated from the CURRENT ETA of the "selected" package. The new DESIRED ETA will equal the CURRENT ETA of the "selected" package plus the length of the assessment, if warranted, without carrying out adjustments that will merely require compensating adjustments later. By initiating execution of the scheduler routine only upon the occurrence of events, rather than repetitively, the routine is available, without requiring completion of a partial loop through software in order to react to real-time events and update parameters rapidly. The use of lookup tables to determine suggested speed adjustments based on ETA DIFFERENCE, for modifying the estimated time of arrival to reflect speed adjustments, to modify ETA based on past speed adjustments and to convert conveyor travel at nominal speed to time and vice versa, is a further enhancement to the speed of execution of the software routine. However, these determinations could alternatively be made by a calculation algorithm.

C) Alternative Embodiment

Figure 8:
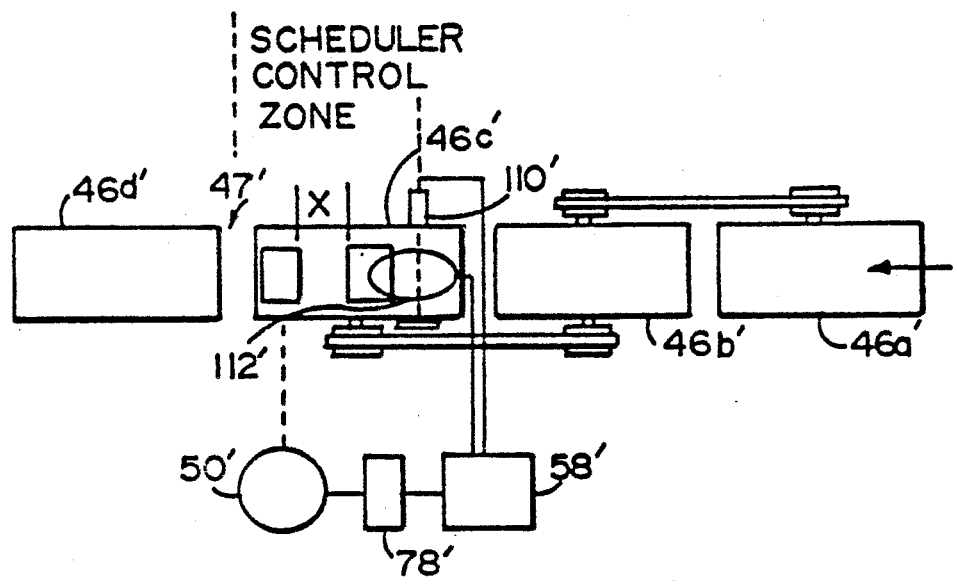
FIG. 8 is a plan view of an alternative embodiment.

In an alternative embodiment illustrated in FIG. 8, the distance X between the trailing edge of a leading package and the leading edge of subsequent packages is measured on metering conveyor 46c' at photo eye 110' by microcomputer 58 in order to determine if the gap X is equal to the desired gap length. If not, an amount of adjustment (S) that is required is determined.

If the amount of gap adjustment (S) is below a predetermined value, it can be concluded that no hold period is required and $$t_r = \tfrac{1}{2} t_a = \geq \sqrt{S/a}$$

where $t_r$ = ramp 1 duration = ramp 2 duration
where $t_a$ = duration of adjustment event
  a = absolute magnitude of acceleration
  S = difference actual gap
If the amount of gap adjustment (S) is above a predetermined level, then a hold period will occur and:

$$t_{total} = t_r + t_{max}$$
$$= t_r + (S - 2S_r)/(V_{max} - V_{nom})$$

where:
$V_{max}$ = Velocity of the discrete adjustment speed level
$V_{nom}$ = Velocity of the nominal speed level
$S_{rm}$ = gap adjustment during ramp 1
Substituting $t_r = (V_{max} - V_{nom})/a = $ constant$_1$
and: $S_r = \tfrac{1}{2} a t_r^2 = $ constant$_2$
it may be seen that the value of $t_{total}$, which is the parameter that determines the amount of adjustment, is a function of S.

Once the lengths of the ramps and hold are determined and the prior package is discharged to the receiving conveyor, microcomputer 58 provides commands for the duration of ramp 1 and hold periods, requesting speed 0 or 2 and, for the duration of ramp 2 period and beyond, requesting a return to nominal speed. The distance between emitter/detector 110' and point of discharge 47' designated D, is predetermined. Pulses generated by encoder 112' are counted after the trailing edge of a package clears one-half the length of the article. At this point, microcomputer 58 determines that one-half the length of the package is on conveyor 46d', that is, the package has transitioned to conveyor 46d'. Photo eye 110' is spaced sufficiently from the receiving conveyor that the gap correction may be accomplished and the speed of the metering conveyor returned to nominal before the longitudinal center of a subsequent package reaches the point of discharge.

Other changes and modifications in the specifically described embodiments can be carried out without departing from the principles of the invention which is intended to be limited only by the scope of the appended claims, as interpreted according to the principles of patent law, including the doctrine of equivalents.

The embodiments of the invention in which an exclusive property or privilege is claimed are defined as follows:

1. A conveyor system comprising:
   a first conveying line having a package conveying means for transporting packages and discharge means for discharging packages from said first conveying line conveying means;
   a second conveying line having a package conveying means for transporting packages and discharge means for discharging packages from said second conveying line conveying means;
   receiving means associated with said discharge means for both said conveying lines for receiving packages discharged from both said conveying means; and
   control means for controlling both of said conveying lines, said control means comprising
   means for controlling the speed of each of said conveying means, said speed controlling means including means for operating each of said conveying means at least a first nominal speed, a second speed that is greater than said nominal speed and a third speed that is less than said nominal speed;
   means for monitoring movement of packages on each of said conveying means and for actuating said speed controlling means in a manner to cause packages to reach said discharge means at times that will create desired gaps between packages received by said receiving means, said actuating means including means for selecting among said nominal speed, said second speed and said third speed for each of said conveying means.

2. The conveyor system in claim 1 in which said actuating means further includes means for controlling the rate of acceleration of said conveying means.

3. The conveyor system in claim 1 in which said control means further includes
   means for determining the moment a package on each of said lines would reach the discharge means, associated with the line, with the conveying means associated with the line travelling at the present speed,
   means for determining the amount of speed adjustment that would be required for each speed controlling means to cause said package on each of said lines to reach the discharge means, associated with the line, at a desired time and for determining which said package would reach the discharge means, associated with the line, closest to said desired time, and
   means for causing said speed controlling means for the conveying means having said package which would reach the discharge means, associated with the line, closest to said desired time to adjust the speed of the conveying means, associated with the line, whereby packages are merged onto said receiving means from both said conveying lines with desired gaps between packages.

4. A conveyor system comprising:

a first conveying line having a package conveying means for transporting packages and discharge means for discharging packages from said first conveying line conveying means;

a second conveying line having a package conveying means for transporting packages and discharge means for discharging packages from said second conveying line conveying means;

receiving means associated with said discharge means for both said lines for receiving packages discharged from both said conveying means; and control means for controlling both of said conveying lines, said control means comprising means for controlling the speed of each of said conveying means, means for monitoring movement of packages on each of said conveying means, means for determining the moment in time that a package on each of said lines would reach the discharge means, associated with that particular line, with he conveying means, associated with that line, travelling at its present speed, means for determining the amount of speed adjustment that would be required for each speed controlling means to cause said package on each of said lines to reach the discharge means, associated with the line, at a desired time that will provide a desired gap with another package and for determining which said package would reach the discharge means, associated with that line, at a moment in time that is closest to said desired time, and means for causing said speed controlling means for the conveying means having said package which would reach the discharge means, associated with that particular line, at a moment in time that is closest to said desired time to adjust the speed of the conveying means, associated with the line, whereby packages are merged onto said receiving means from both said conveying lines with desired gaps between packages.

5. The conveyor system in claim 4 in which said determining means determines said desired time as a function of the time that a previous package to be discharged would reach its discharge means and a desired gap to be provided between packages.

6. The conveyor system in claim 5 in which said desired gap is constant for all packages.

7. The conveyor system in claim 4 in which said means for monitoring the movement of packages includes package position sensor means for sensing the leading and trailing edges of packages on each of said conveying means and means for determining the distance of the center between said edges from the associated said discharge means.

8. The conveyor system in claim 7 in which said means for monitoring further includes means for measuring movement of each conveying means.

9. A conveyor system comprising:

a plurality of conveying lines, each of said conveying lines having a package conveying means for transporting packages and discharge means for discharging packages from said conveying line means; and control means for controlling said conveying lines, said control means comprising means for controlling the speed of each of said conveying means, means for monitoring movement of packages on each of said conveying means, means for determining an estimated moment in time that a package on each of said lines wold reach the discharge means associated with that particular line, with the conveying means associated with that line, travelling at its present speed, means for determining the amount of speed adjustment that wold be required for each conveying means to cause said package on each of said lines to reach the discharge means, associated with that particular line, at an actual moment in time that is as close to a desired time as possible without exceeding a predetermined level of acceleration, means for identifying the one line whose package would reach the discharge means, associated with that line, at an actual moment in time that is closest to said desired time and for selecting a new desired time for lines other than said one line as a function of the actual time the package on said one line will reach the discharge means associated with that line.

10. The conveyor system in claim 9 including means for causing said speed controlling means to adjust the speed of said conveying means according to the speed adjustment determined for the line associated with each controlling means.

11. The conveyor system in claim 9 in which said means for selecting a new desired time includes means for selecting said new time as a function of the desired gap to be provided between packages.

12. The conveyor system in claim 11 in which said desired gap is constant for all packages.

13. The conveyor system in claim 9 in which said means for monitoring the movement of packages includes package position sensor means for sensing the leading and trailing edges of packages on each of said conveying means and means for determining the distance of the center between said edges from the associated said discharge means.

14. The conveyor system in claim 13 in which said means for monitoring further includes means for measuring movement of each conveying means.

* * * * *

UNITED STATES PATENT AND TRADEMARK OFFICE
CERTIFICATE OF CORRECTION

PATENT NO. : 5,038,911

DATED : 8/13/91

INVENTOR(S) : Martin R. Doane et al

It is certified that error appears in the above-identified patent and that said Letters Patent is hereby corrected as shown below:

Column 2, line 39:
 "at least" should be --at at least--.

Column 13, line 30:
 After "½ta=" delete --$\geq$--.

Column 13, line 35:
 After "difference" insert --between desired and--.

Column 13, line 62:
 After "clears" insert --emitter/detector 110' until they equal the distance D minus--.

Column 15, line 22, claim 4:
 "with he" should be --with the--.

Column 16, line 17, claim 9:
 "wold" should be --would--.

Column 16, line 22, claim 9:
 "wold" should be --would --.

Signed and Sealed this

Sixth Day of April, 1993

*Attest:*

STEPHEN G. KUNIN

*Attesting Officer*   *Acting Commissioner of Patents and Trademarks*